(12) United States Patent
Yamagishi et al.

(10) Patent No.: US 6,584,851 B2
(45) Date of Patent: Jul. 1, 2003

(54) FLUID PRESSURE SENSOR HAVING A PRESSURE PORT

(75) Inventors: Kouzou Yamagishi, Tokyo (JP);
Yoshihiro Tomomatsu, Tokyo (JP);
Atsushi Imai, Tokyo (JP)

(73) Assignee: Nagano Keiki Co., Ltd., Tokyo (JP)

( * ) Notice: Subject to any disclaimer, the term of this patent is extended or adjusted under 35 U.S.C. 154(b) by 0 days.

(21) Appl. No.: 09/997,297

(22) Filed: Nov. 29, 2001

(65) Prior Publication Data

US 2002/0062697 A1 May 30, 2002

(30) Foreign Application Priority Data

Nov. 30, 2000 (JP) ........................................ 2000-365272
Dec. 1, 2000 (JP) ........................................ 2000-366761

(51) Int. Cl.[7] ................................................. G01L 7/08
(52) U.S. Cl. ............................. 73/715; 73/756; 73/718; 73/721
(58) Field of Search ......................... 73/756, 718, 721, 73/700, 715; 156/89; 361/793, 720

(56) References Cited

U.S. PATENT DOCUMENTS 5,676,781 A * 10/1997 Aoki et al. .................. 156/89

5,880,372 A 3/1999 Nasiri

FOREIGN PATENT DOCUMENTS

| EP | 0 403 254 | 12/1990 | |
|---|---|---|---|
| EP | 1 116 943 | 7/2001 | |
| JP | 6-129926 | 5/1994 | |
| JP | 7-14345 | 3/1995 | |
| JP | 2533357 | 1/1997 | |
| JP | 10-037202 | * 2/1998 | ............. G01L/9/04 |
| JP | 11-142267 | 5/1999 | |
| JP | 11-142268 | 5/1999 | |
| JP | 11-142272 | 5/1999 | |
| JP | 11-237291 | 8/1999 | |
| JP | 2000-214040 | 8/2000 | |

* cited by examiner

Primary Examiner—Hezron Williams
Assistant Examiner—Jermaine Jenkins
(74) Attorney, Agent, or Firm—Flynn, Thiel, Boutell & Tanis, P.C.

(57) ABSTRACT

A pressure sensor has a joint (1) having a pressure port (13), a pressure detecting device (2) bonded to the joint (1) to convert fluid pressure to an electric signal and a housing (5) provided to an output side of the pressure detecting device (2), the pressure sensor further including a flange member (3) bonded to the joint (1) and having a through-hole (26) for the pressure detecting device (2) to be inserted and a connector (6) bonded to the flange member (3) to fix the housing (5).

27 Claims, 19 Drawing Sheets

FLUID PRESSURE SENSOR HAVING A PRESSURE PORT

BACKGROUND OF THE INVENTION

1. Field of the Invention

The present invention relates to a pressure sensor for converting a fluid pressure into an electric signal to output to outside, which more specifically relates to an improvement in an assembly structure and signal-processing circuit board thereof.

2. Description of Related Art

In general, a pressure sensor for detecting a fluid pressure has a joint having a pressure port, a pressure detecting device attached to the joint for converting the fluid pressure introduced to the pressure port to an electric signal, a circuit board disposed immediately above the pressure detecting device and having a circuit for processing the electric signal from the pressure detecting device, and a housing for protecting the pressure detecting device and the circuit board (see, for instance, Japanese Patent Laid-Open Publication No. Hei 11-142267 and 11-237291).

FIG. 25 shows a structure of a conventional pressure sensor.

The pressure sensor has a joint 1 screwed to a mount A such as a tube shown in dotted line, a pressure detecting device 2 welded to the joint 1 and an output means 4 for outputting an electric signal toward outside in accordance with the pressure detected by the pressure detecting device 2.

The joint 1 is provided with a pressure port 13 for introducing fluid pressure at a center of a body 12 formed with a male thread 11 screwed to the mount A on an outer wall thereof, and a butt welding portion 15 widening in tapered manner projects upward from a surface of the joint 1 at the upper center of the joint 1. A flange 14 is integrally formed on an upper portion of the body 12, where a thin crimping part 1A is carved on an upper outer wall of the flange 14.

The pressure detecting device 2 is welded to the butt welding portion 15 and a metal case 1B is welded to an upper surface of the flange 14. A lower end of the housing 5 as a connector is fitted between the case 1B and the crimping part 1A through an O-ring 38 and is caulked by the crimping part 1A.

A cylindrical base 1D surrounding the pressure detecting device 2 is held by a projection 1C formed by bending a part of the case 1B. A support piece 1E is formed by cutting and raising an upper inside of the case 1B. A circuit board 7 connected to the pressure detecting device 2 is supported by the support piece 1E.

Since the body 12 and the flange 14 of the joint 1 are integrated in the conventional pressure sensor, following disadvantages occurred.

In order to weld the pressure detecting device 2 to the butt welding portion 15, the butt welding portion 15 has to be projected above the surface of the flange 14. It is because, when the butt welding portion 15 is retracted relative to the flange 14, the pressure detecting device 2 has to be welded from obliquely above in a narrow space, which makes welding management such as weld line alignment difficult. However, when the butt welding portion 15 is projected above the surface of the flange 14, the entire length of the pressure sensor and size thereof can be increased accordingly.

In order to restrain enlargement of the outer diameter of the pressure sensor, the circuit board 7 may preferably be located above the pressure detecting device 2. However, in the conventional arrangement, since the pressure detecting device 2 projects above the surface of the flange 14, the circuit board 7 has to be supported by the support piece 1E to be away from the pressure detecting device 2, thus lengthening the pressure sensor.

Further, since the crimping part 1A for fixing the housing 5 is carved to be a thin portion, much work is necessary for processing, thereby increasing production cost.

Elimination of the above disadvantage of the conventional pressure sensor has been strongly desired, where the entire length can be shortened, weld line alignment work can be facilitated and eliminating the need for machining work of the crimping part to reduce production cost.

On the other hand, in a pressure sensor according to the above-described Japanese Patent Laid-Open Publication No. Hei 11-142267 (first conventional art), since a hole for accommodating the pressure detecting device is formed at the center of the circuit board, a circuit component such as integrated circuit has to be located outside the circuit board, so that the outer diameter of the circuit board are increased, thereby making it difficult to reduce the size (diameter) of the product.

In a pressure sensor according to the above-described Japanese Patent Laid-Open Publication No. Hei 11-237291 (second conventional art), since the integrated circuit opposes the pressure detecting device and the pressure detecting device and the circuit board are connected through a spacer, the number of the component and assembly process is increased, thereby also making it difficult to reduce the size (height) of the product.

When a pressure sensor is disposed under an environment with much electromagnetic wave noise, an electric component weak in noise, such as an integrated circuit, has to be protected against foreign noise. When an electro-conductive lid member covering the electric component is separately provided in order to protect the electric component such as integrated circuit from the foreign noise, size reduction becomes difficult. Accordingly, a technique has been proposed where a ground-plane is provided to an intermediate layer of a multi-layered board to form a shielded space (Japanese Patent Laid-Open Publication No. 2000-214040).

Such multi-layered board may be applied to the circuit board of a pressure sensor as shown in, for instance, FIG. 26 and FIG. 27.

The pressure sensor shown in FIG. 26 has a joint 1, a pressure detecting device 2 welded to the joint 1, and a multi-layered circuit board 7 held on the joint 1 and having a ground-plane layer 71 thereinside. The circuit board 7 has an opening 72 for the pressure detecting device 2 to be accommodated at the center thereof. An input/output terminal 77 and a filter circuit 82 are respectively provided on the upper surface of the circuit board 7, and an integrated circuit 81 is mounted on the lower side thereof. The pressure detecting device 2 and the circuit board 7 are connected via a bonding wire 80.

The pressure sensor 27 shown in FIG. 27 has a joint 1, a pressure detecting device 2 welded to the joint 1, and a multi-layered circuit board 7 held on the joint 1 and immediately above the pressure detecting device 2, the circuit board 7 having a ground-plane layer 71 thereinside. The pressure detecting device 2 and the circuit board 7 are connected by a bonding wire 80 via a through-hole opening 72 formed on the circuit board 7.

Since the pressure sensor shown in FIG. 26 can accommodate the pressure detecting device 2 in the opening 72 of the circuit board 7, the height thereof can be reduced and the entire length of the pressure sensor can be shortened. On the other hand, since the diameter of the circuit board 7 in width diameter can be enlarged as in the first conventional art, thereby making it difficult to reduce the size of the pressure sensor.

In the pressure sensor having structure as shown in FIG. 27, since the circuit board 7 is located immediately above the pressure detecting device 2, the diameter of the circuit board 7 in width direction can be reduced and external diameter of the pressure sensor can be reduced. On the other hand, the height thereof is increased, thereby making it difficult to reduce size of the pressure sensor as in the second conventional art. Further, since the distance between the circuit board 7 and the pressure detecting device 2 is increased, the bonding wire 80 is lengthened, thereby deteriorating efficiency in bonding the wiring, and resonance frequency of the wiring is lowered to deteriorate anti-vibration properties thereof.

Accordingly, a pressure sensor having improved circuit board capable of reducing entire length and diameter, improving workability of wire-bonding and anti-vibration properties has been strongly desired.

SUMMARY OF THE INVENTION

An object of the present invention is to provide a pressure sensor capable of solving the above problems, reducing entire length thereof, facilitating weld line alignment, and eliminating the need for carving the crimping part to reduce production cost.

Accordingly, in the present invention, the joint, the flange member and the connector are separated and are bonded so that the pressure detecting device does not project from the flange member.

A pressure sensor according to the present invention has: a joint having a pressure port; a pressure detecting device attached to the joint for converting a fluid pressure introduced to the pressure port into an electric signal; a housing provided to an output side of the pressure detecting device; a flange member bonded to the joint and having a through-hole for accommodating the pressure detecting device at a center thereof; and a connector bonded to the flange member to fix the housing.

According to the above arrangement, since the joint and the flange member are separated and bonded subsequently, the flange member can be bonded after welding the pressure detecting device to the joint, so that butt welding can be used for pressure detecting device to an exposed part having no flange member, thereby facilitating weld line alignment etc.

Since the pressure detecting device can be arranged in a manner not to protrude relative to the upper surface of the flange member, the entire length of the pressure sensor can be reduced.

Further, since the connector is also arranged as an independent body, it is not necessary to carve a thin crimping part on the flange member, so that production cost can be reduced.

In the pressure sensor of the present invention, the connector may preferably have an outer wall on an outside of an inner wall with an annular groove therebetween. And the outer wall may be arranged as a crimping part, the lower peripheral end of the housing may preferably be fitted to the annular groove and the housing may preferably be caulked and fixed by the crimping part.

In the present invention, the connector may preferably have a substantially cylindrical inner wall, a substantially cylindrical outer wall coaxially disposed on an outside of the inner wall and an annular groove formed between the inner wall and the outer wall.

In the above arrangement, a crimping part formed at a peripheral end of the outer wall opposite to the flange member may preferably be provided, and the housing may preferably have a lower end fitted to the annular groove and be caulked by the crimping part.

According to the above arrangement, the connector can be easily and inexpensively produced by presswork of a metal material and the housing can be easily fixed only by deforming and crimping the outer wall of the connector. At this time, a sealing member (e.g. O-ring) may be interposed between the lower end of the housing and the outer wall or the inner wall.

The outer wall may extend on the entire circumference on the outside of the inner wall or, alternatively, may be partially provided at several locations on the outside of the inner wall.

In the pressure sensor of the present invention, either one of lug and notch being mutually fitted may preferably be formed on the inner wall and the housing.

By forming such fitting of the lug and notch, the rotation of the connector and the housing can be prevented, thereby enhancing work efficiency in assembly process.

In the above arrangement, a plurality of pairs of the lug and the notch may preferably be formed, one of the pairs having dimension or configuration different from the other pair.

Alternatively, a plurality of pairs of the lug and the notch may preferably be formed, the pairs being arranged along circumferential direction of the inner wall with unequal interval.

With the use of different lug and notch fitting, the rotary angle position between the connector and the housing can be uniquely determined, thereby smoothly and efficiently conducting assembly to a predetermined relative position.

In the pressure sensor of the present invention, a terminal base may preferably be located inside the housing, and a bent end capable of being bent toward inside may preferably be formed at a peripheral end of the inner wall opposite to the flange member, the bent end crimping and fixing the terminal base to the flange member.

According to the above arrangement, the terminal base can be easily fixed only by deforming and crimping the inner wall of the connector.

In the above arrangement, the peripheral end of the inner wall opposite to the flange member may preferably be divided by a plurality of notches.

Accordingly, crimping process can be easily conducted.

In the pressure sensor of the present invention, either one of lug and notch being mutually fitted may preferably be formed on the inner wall and the terminal base.

With the use of different lug and notch fitting, the rotation of the connector and the terminal base can be prevented, thereby enhancing work efficiency during assembly process.

In the above arrangement, a plurality of pairs of the lug and the notch may preferably be formed, one of the pairs having dimension or configuration different from the other pair.

Alternatively, a plurality of pairs of the lug and the notch may preferably be formed, the pairs being arranged along circumferential direction of the inner wall with unequal interval.

With the use of different lug and notch fitting, the rotary angle position between the connector and the terminal base can be uniquely determined, thereby smoothly and efficiently conducting assembly to a predetermined relative position.

In the pressure sensor of the present invention, a circuit board connected to the pressure detecting device may preferably be located on an upper side of the flange member.

In mounting the circuit board, the circuit board may preferably be fixed using adhesive etc.

According to the above arrangement, the entire length of the pressure sensor can be reduced by disposing the circuit board directly on the flange member. Further, since the circuit board is disposed directly on the flange member, the support base for supporting the circuit board above the pressure detecting device can be omitted, thereby reducing the number of components and production cost.

In the pressure sensor of the present invention, the circuit board may preferably include: a ground land capable of being soldered formed on the surface of the circuit board; and a ground terminal soldered to the ground land and welded to the flange member.

According to the above arrangement, the ground terminal can be soldered in mounting the component to the circuit board, so that the circuit board can be mounted to the pressure sensor only by welding to the flange member, thereby omitting repeated soldering process. Specifically, in the conventional arrangement, though the flux is removed after mounting the components on the circuit board, subsequent flux removal is necessary when the circuit board is installed to the pressure sensor in the subsequent process. By using the ground terminal of the present invention, only welding is necessary in mounting to the pressure sensor, so that repeated soldering and flux removal can be omitted, thereby simplifying production process.

Another object of the present invention is to improve the arrangement of the circuit board, thereby providing a pressure sensor capable of reducing entire length and diameter and improving workability of wire-bonding and vibration strength.

In the pressure sensor of the present invention, the circuit board may preferably have a multi-layered structure of a plurality of conductor layers, and at least one of the conductor layer may preferably have a projection projecting relative to the other conductor layer, the projection being located around immediately above the pressure detecting device.

According to the above arrangement, since the at least one of the conductor layer has the projection projecting relative to the other conductor layer and being disposed around immediately above the pressure detecting device, the conductor layer for the circuit component and connection can be provided on the projection, so that the component can be disposed without widening the circuit board and the size of the pressure sensor can be reduced. Further, the distance between the pressure detecting device and the conductor layer can be reduced, the bonding wire can be shortened, the work efficiency of wire bonding can be improved and vibration strength can be improved.

In the pressure sensor of the present invention, the circuit board may preferably have an opening for accommodating the pressure detecting device and the uppermost conductor layer may preferably be projected to the opening to form the projection.

According to the above arrangement, since the pressure detecting device is accommodated in the opening, the height can be reduced, thereby reducing entire length, i.e. the size, of the pressure sensor.

In the pressure sensor of the present invention, at least one of the conductor layers near the pressure detecting device may preferably project relative to the other conductor layer to form the projection, the conductor layer having the projection and the pressure detecting device may preferably be connected, the conductor layer other than the conductor layer having the projection may preferably be a ground-plane layer, and a circuit component for forming a circuit on the circuit board may preferably be provided on a surface of the circuit board facing the pressure detecting device.

Accordingly, since the bonding wire is connected from the projection near the pressure detecting device to the pressure detecting device, the wiring length can be shortened and the circuit component can be located in a shielded space formed by the ground-plane layer to provide protection against noise.

In the pressure sensor according to the present invention, a recess may preferably be formed on a pressure detecting device side of the circuit board, the circuit component forming a circuit being attached to the recess.

According to the above arrangement, since the circuit component is attached to the recess formed on the pressure detecting device side of the circuit board, the length of the bonding wire for electrically connecting the pressure detecting device and the circuit board can be further shortened. Further, by burying the circuit component in the recess, the circuit component can be located immediately above the pressure detecting device, the outer dimension of the circuit board can be further reduced. Accordingly, advantages such as the size reduction (height and diameter reduction) of the product and improvement in vibration strength and assembly efficiency can be obtained.

In the pressure sensor of the present invention, the circuit board may preferably be a multi-layered substrate using ceramics as an insulation layer.

According to the above arrangement, component mounting and ground connection are possible within a narrow space by the three-dimensional circuit board, so that the size of the pressure sensor can be reduced. Further, the heat resistance of the circuit board and noise immunity on account of high permittivity can be improved.

DETAILED DESCRIPTION OF PREFERRED EMBODIMENT(S)

Embodiments of the present invention will be described below with reference to attached drawings.

[First Embodiment]

Figure 1:
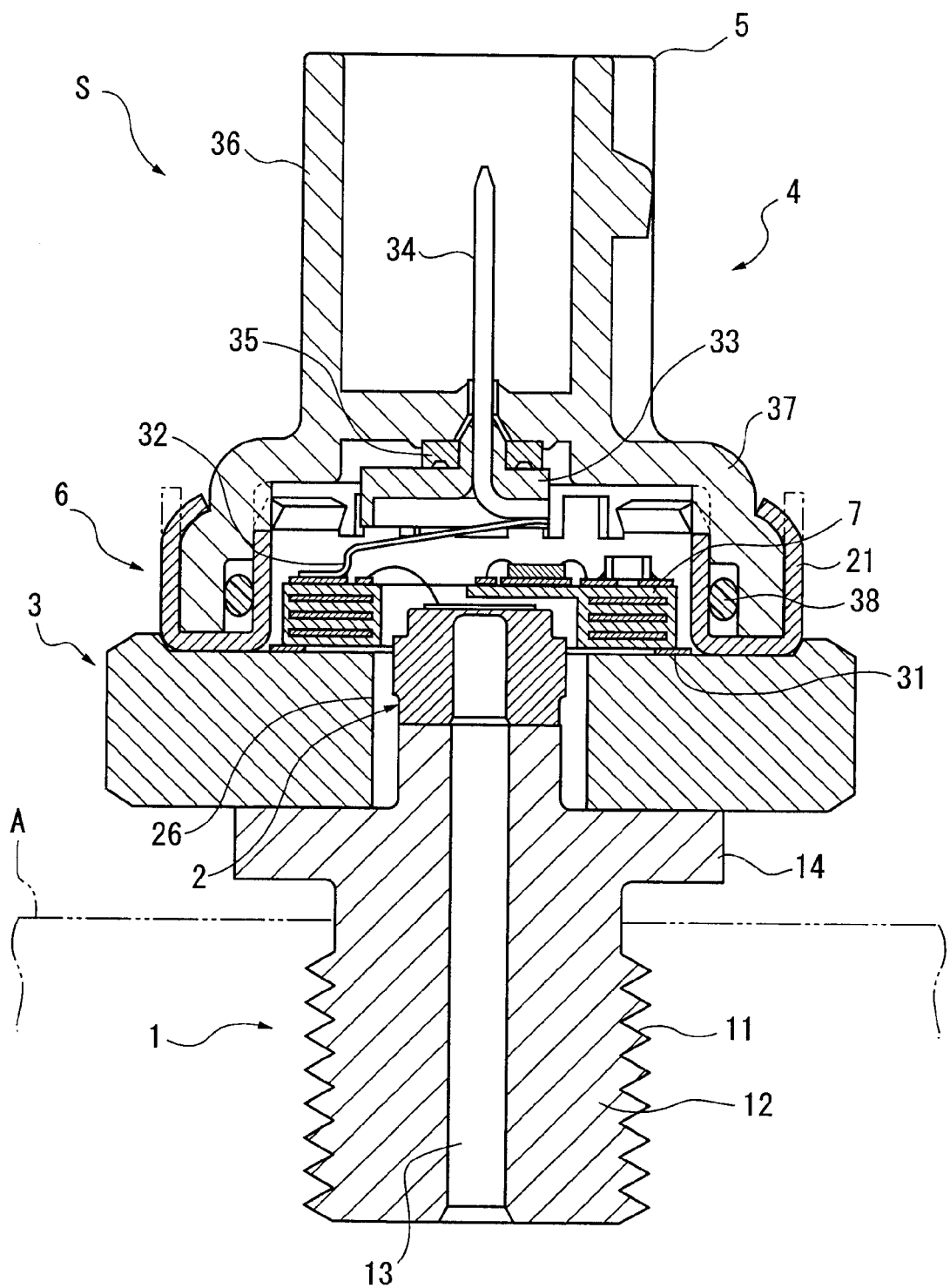
FIG. 1 is a vertical cross section showing a pressure sensor according to first embodiment of the present invention.

In FIG. 1, a pressure sensor S according to the present embodiment has a joint 1 screwed to a mount A such as a tube shown in dotted line, a pressure detecting device 2 welded to the joint 1 by electron beam or laser, a flange member 3 bonded on the joint 1, and an output means 4 for outputting an electric signal to the outside in accordance with the pressure detected by the pressure detecting device 2. A housing 5 of the output means 4 is fixed to the flange member 3 through a connector 6.

Figure 2:
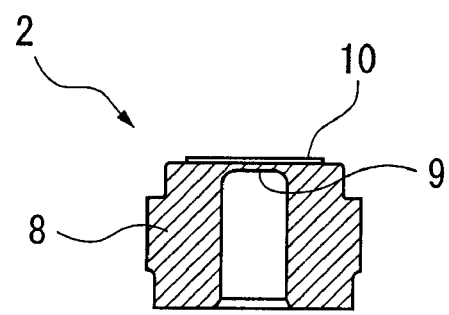
FIG. 2 is a vertical cross section showing a pressure detecting device of the first embodiment.

FIG. 2 shows an example of the pressure detecting device 2.

The pressure detecting device 2 has a cylindrical support base 8 composed of metal having excellent mechanical strength, corrosion resistance and spring properties such as precipitation hardening stainless steel (e.g. 17-4PH) integrated with a metal diaphragm 9 provided on the surface thereof, the diaphragm 9 deforming with a fluid pressure. A strain gauge 10 for converting the pressure (strain of the metal diaphragm 9 in proportion to the pressure) into an electric signal is provided on the upper side of the metal diaphragm 9.

Figure 3:
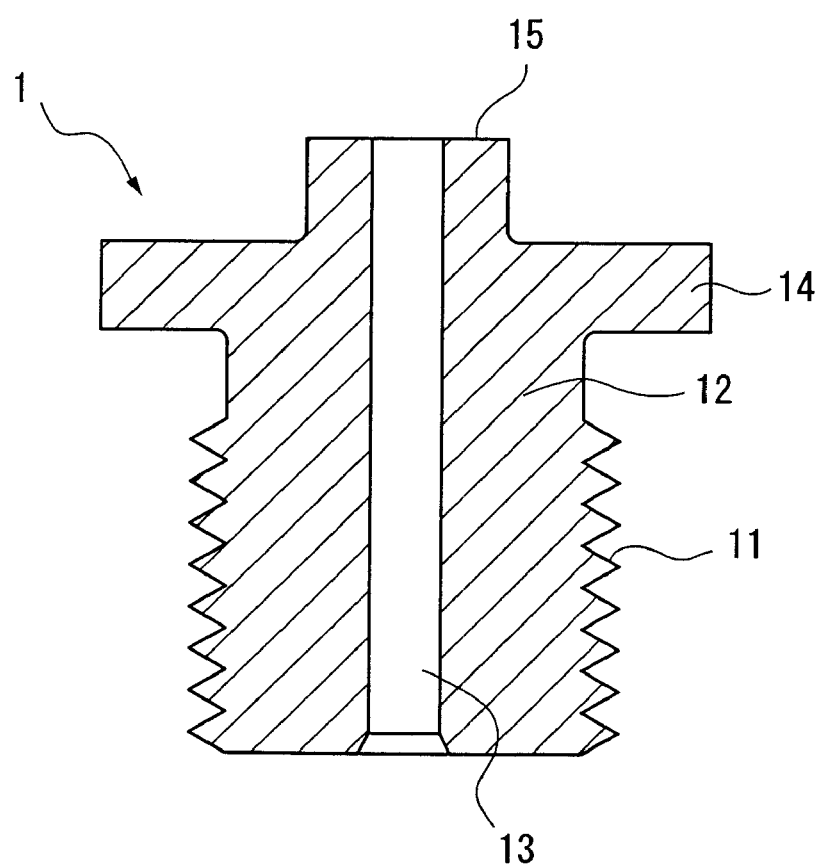
FIG. 3 is a vertical cross section showing a joint of the first embodiment.

FIG. 3 shows an example of structure of the joint 1.

The joint 1 has a body 12 having a male thread 11 to be screwed to the mount A on an outer wall thereof. A pressure port 13 for introducing a fluid pressure penetrates the center of the body 12, a flange 14 is formed on the upper part thereof and a butt welding portion 15 projecting upward is formed on the upper center thereof.

Different material of the joint 1 may preferably be used in accordance with pressure range. Specifically, a ferrite or austenite stainless steel (e.g. SUS430, SUS304) may preferably be used in low/mid pressure range (e.g. less than 100 MPa). Precipitation hardening stainless steel (e.g. 17-4PH) may preferably be used in high pressure range (e.g. more than 100 MPa).

Figure 4:
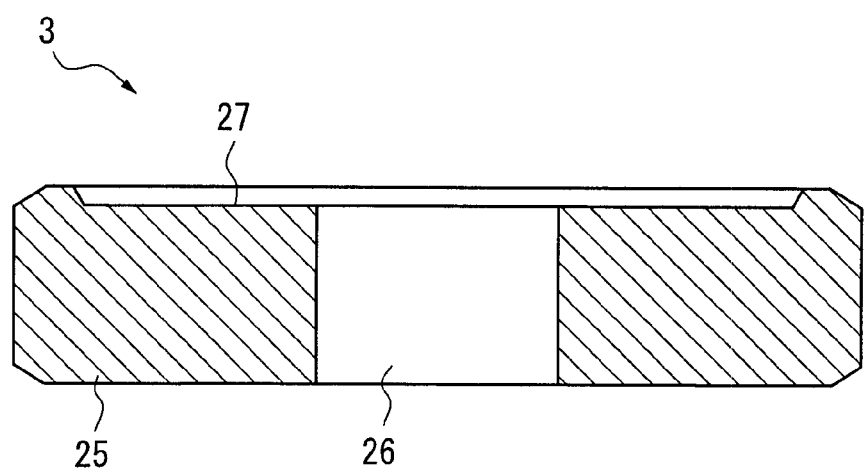
FIG. 4 is a vertical cross section showing a flange member of the first embodiment.

FIG. 4 shows an example of the structure of the flange member 3.

The flange member 3 is a component for fixing the joint 1 to the mount A and has a body 25 having polygonal (i.e. polygonal shape capable of being rotated with a wrench and adjustable spanner) outer shape in this example. The body 25 has a through hole 26 for accommodating the pressure detecting device 2 at the center thereof and a shallow recess 27 is formed on the upper surface thereof. The circuit board 7 connected to the pressure detecting device 2 is disposed to the recess 27 via an adhesive 31, and the connector 6 is bonded to the outer wall thereof. Incidentally, the flange member 3 may preferably be made of stainless steel, however, general-type steel may be used as long as there is no special requirement for welding properties, strength and corrosion resistance.

Figure 5:
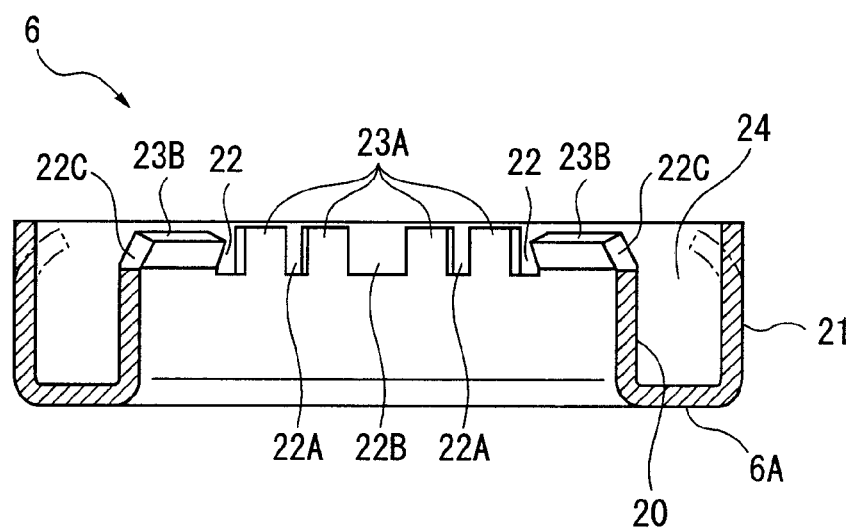
FIG. 5 is a vertical cross section showing a connector of the first embodiment.
Figure 6:
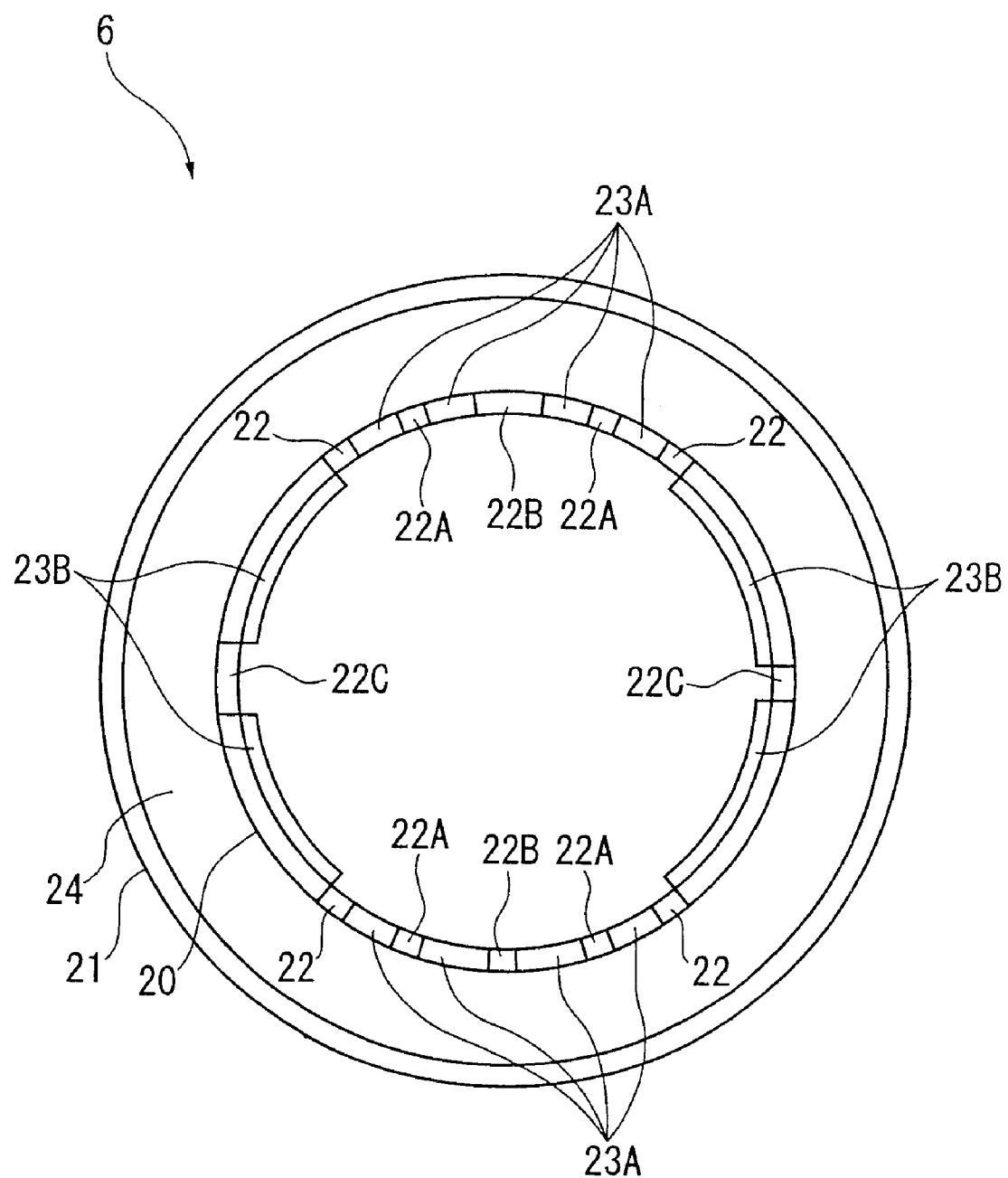
FIG. 6 is a plan view showing the connector of the first embodiment.

FIGS. 5 and 6 show an example of the connector 6.

The connector 6 is formed in a shape having an outer wall 21 on an outside of a cylindrical inner wall 20 with an annular groove 24 therebetween by presswork of metal material (stainless steel or general-type steel). Specifically, an annular bottom surface 6A is formed from a lower end of the inner wall 20 to the outside, and the outer wall 21 is perpendicularly raised from an outer wall of the bottom surface 6A, thereby forming double cylindrical shape with U-shaped one-side cross section formed by the inner wall 20, the bottom surface 6A and the outer wall 21.

The outer wall 21 is a crimping part having an upper end, a part of the upper end deforming toward the inside along the shape of the housing 5 as shown in dotted line when being caulked. The bottom surface 6A is bonded to the recess 27 on the upper surface of the flange member 3. A plurality of notches 22 are formed on the upper peripheral end of the inner wall 20 to be divided in plural, the respective divided portions being bent ends 23A and 23B capable of being bent toward inside.

Among the bent ends 23A and 23B, the bent end 23B other than the two opposing bent ends 23A are bent toward inside in advance. The opposing two bent ends 23A are bent to the inside when a terminal base 33 connected to the circuit board 7 through a terminal 32 is caulked. Accordingly, the terminal base 33 is caulked and fixed on the flange member 3. The number of the bent ends 23A may be more than two, and the position of the bent ends 23A may be arranged in any manner as long as the bent ends 23A are mutually separated with, for instance, equal interval. The circumference of the upper end of the bent end 23B can be used as a guide for inserting the O-ring as described below.

A notch 22B for engaging the terminal base is formed on the bent end 23A, and a notch 22C for engaging with the housing is formed to the bent end 23B.

As clearly shown in FIG. 6, the notch 22B is formed at the center of the bent end 23A by cutting process and another notch 22A is formed on both sides thereof. The notch 22B on the upper side of FIG. 6 is approximately twice as wide as the notch 22B on the lower side of the FIG. 6. The notch 22C is formed at the center of the bent ends 23 by cutting process. The notch 22C on the left side of FIG. 6 is approximately twice as wide as the notch 22C on the right side of FIG. 6.

The notches 22B and 22C are engaged with the below-described terminal base 33 and the housing 5, so that the notches works to engage with the connector 6 at a predetermined regular rotary position.

Figure 7:
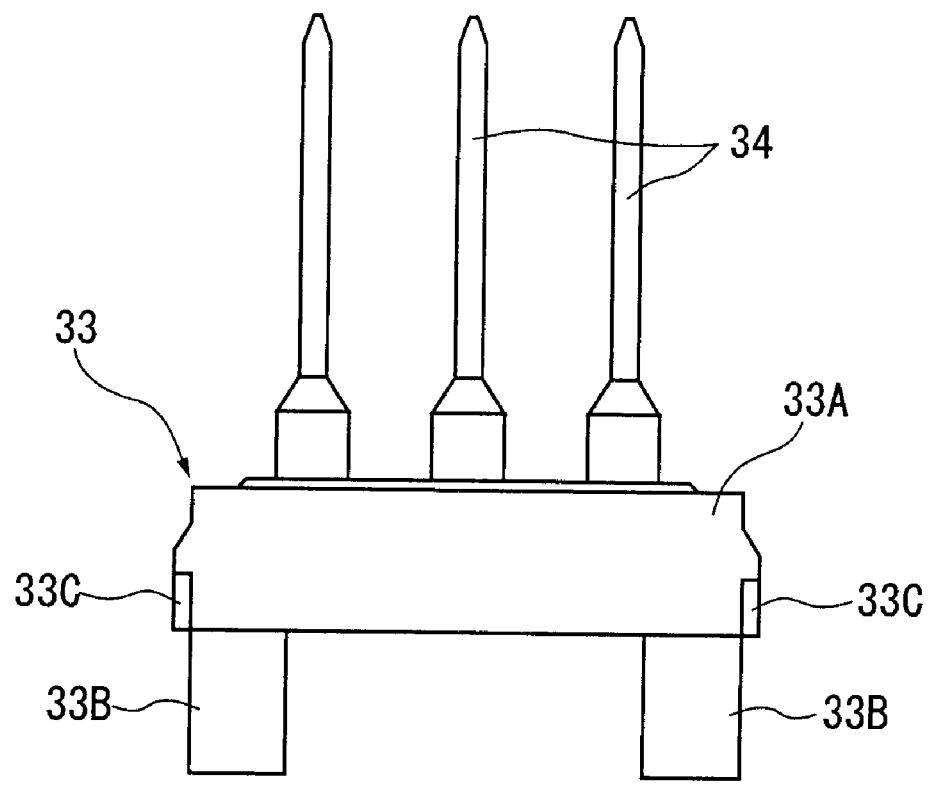
FIG. 7 is a front elevational view showing a terminal base of the first embodiment.
Figure 8:
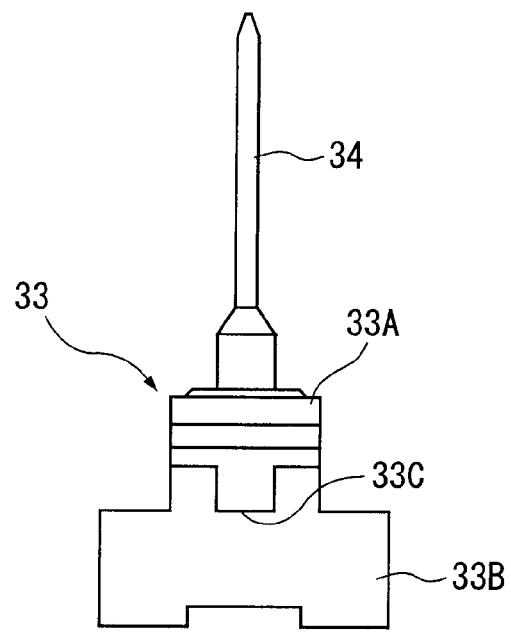
FIG. 8 is a side elevational view showing the terminal base of the first embodiment.
Figure 9:
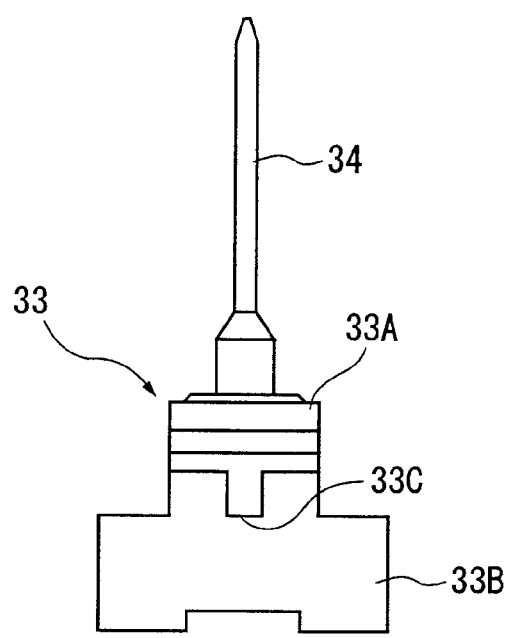
FIG. 9 is another side elevational view showing another side of the terminal base of the first embodiment.

FIGS. 7 to 9 show an example of a structure of the terminal base 33.

The terminal base 33 is a molding formed by an insulative synthetic resin and integrated with a leg 33B respectively on both sides of the rectangular body 33A. Three terminals 34 penetrate the body 33A supported by the body. Lower end of the terminal 34 is exposed to the inside of the body 33A and the upper end of the terminal 34 is inserted to the housing 5 (see FIG. 1). When the terminal base 33 is installed in the pressure sensor, two pairs of the outer bent ends 23A, total four, are bent to the inside of the connector 6 while the leg 33B is in contact with the recess 27 on the upper surface of the flange member 3 and the upper periphery of the leg 33B is pressed to hold the terminal base 33.

Lug 33C for fitting with the connector 6 is formed on the respective ends of the body 33A. As shown in FIG. 8, one of the lugs 33C is approximately twice as wide as the other of the lugs 33C shown in FIG. 9. Accordingly, the lug 33C shown in FIG. 8 can be fitted to the wider notch 22B on the upper side of FIG. 6 and the lug 33C shown in FIG. 9 can be fitted to the narrower notch 22B on the lower side of FIG. 6.

By fitting the two lugs 33C and notches 22B having different width, the terminal base 33 is engaged with the connector 6 only in a correct posture.

Figure 10:
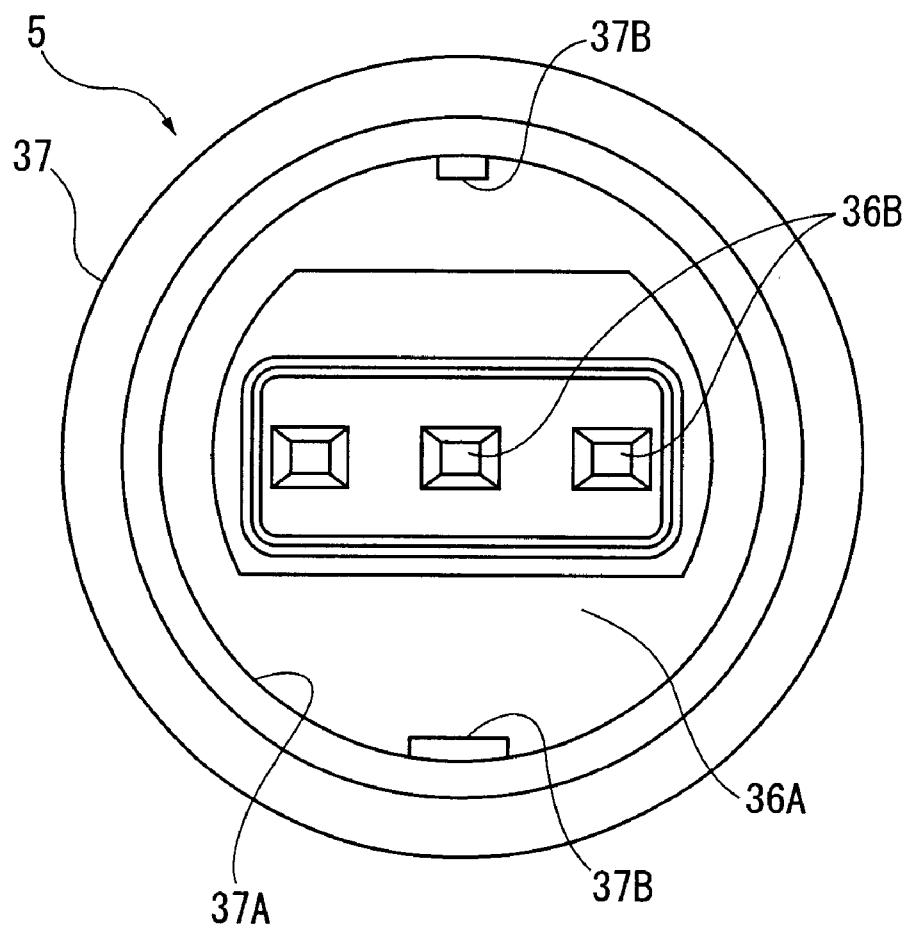
FIG. 10 is a bottom plan view showing a housing of the first embodiment.
Figure 11:
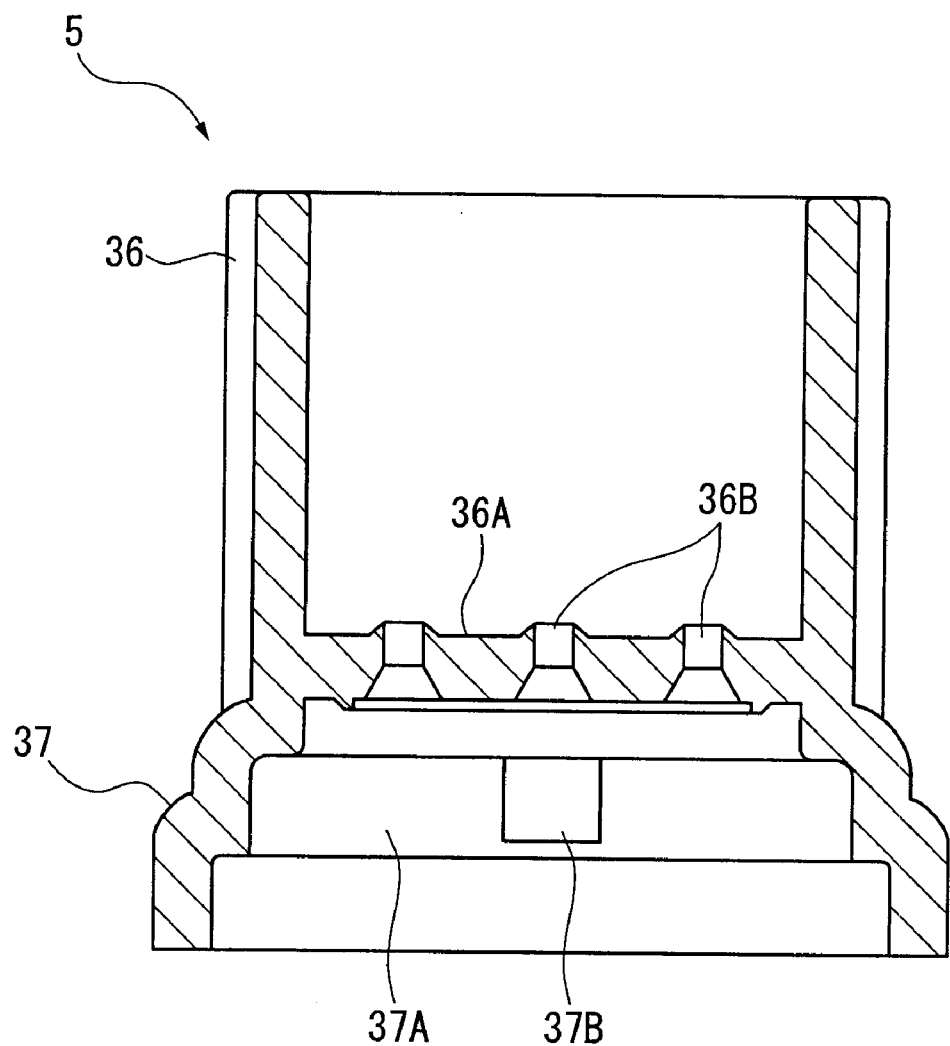
FIG. 11 is a vertical cross section showing the housing of the first embodiment.
Figure 12:
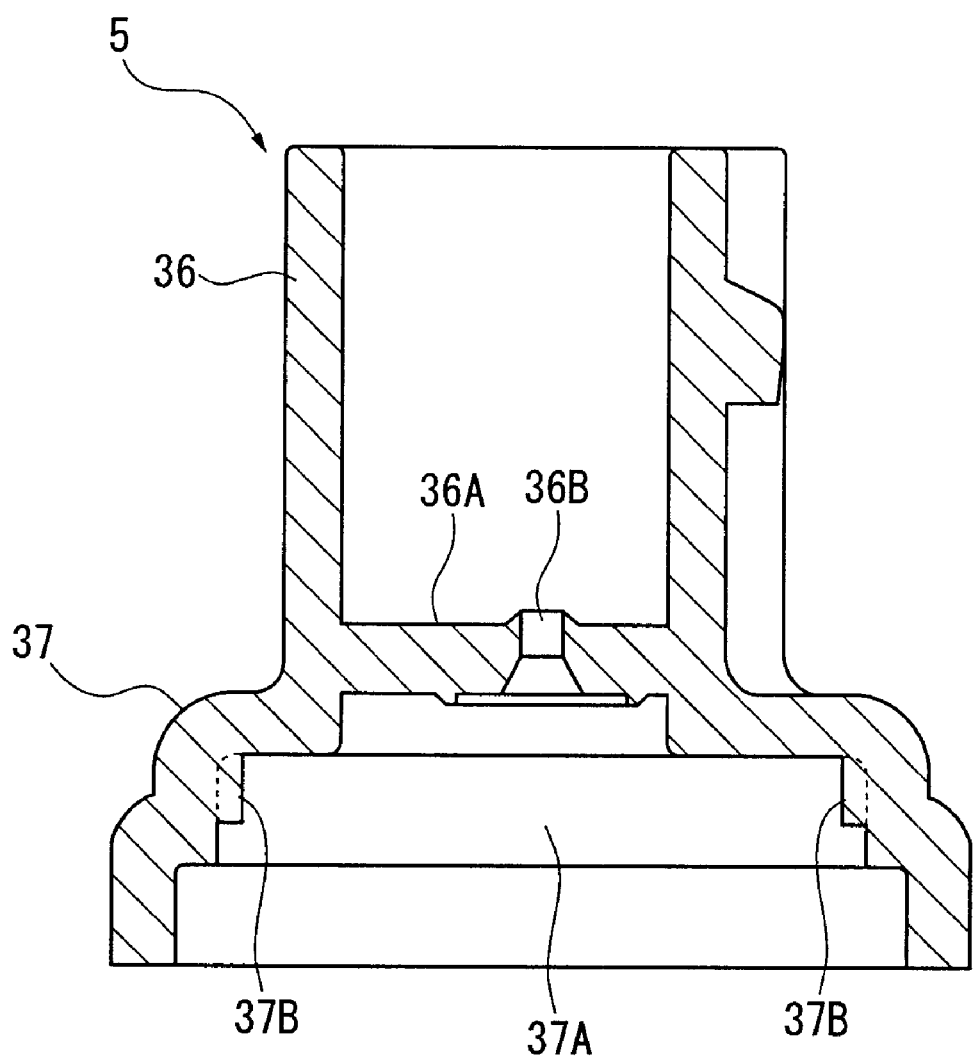
FIG. 12 is a vertical cross section showing the housing facing in another direction of the first embodiment.

FIGS. 10 to 12 show an example of the housing 5.

The housing 5 is a molding composed of an insulative synthetic resin and has an attachment 37 having enlarged diameter integrated to a lower part of a bottomed cylinder 36.

Three through-holes 36B are formed to the bottom surface 36A of the bottomed cylinder 36, to which the terminals 34 of the terminal base 33 are respectively penetrated.

A step is formed on the inside of the attachment 37 and a sealing O-ring 38 is provided at a part having the maximum inner diameter adjacent to the lower end (see FIG. 1). The inner wall 20 of the connector 6 holding the terminal base 33 is fitted to a second step surface 37A.

Lugs 37B to be fitted to the connector 6 are formed at a position opposing the step surface 37A. One of the lugs 37B shown in FIG. 10 is approximately twice as wide as the other. The lug 37B shown in lower side of FIG. 10 can be fitted to the wider notch 22C on the right side of FIG. 6 and the lug 37B shown in upper side of FIG. 10 can be fitted to the narrower notch 22C on the left side of FIG. 6.

By fitting the two types of lugs 37B and the notches 22C having different width, the housing 5 can be engaged with the connector 6 only in a predetermined correct posture.

Figure 13:
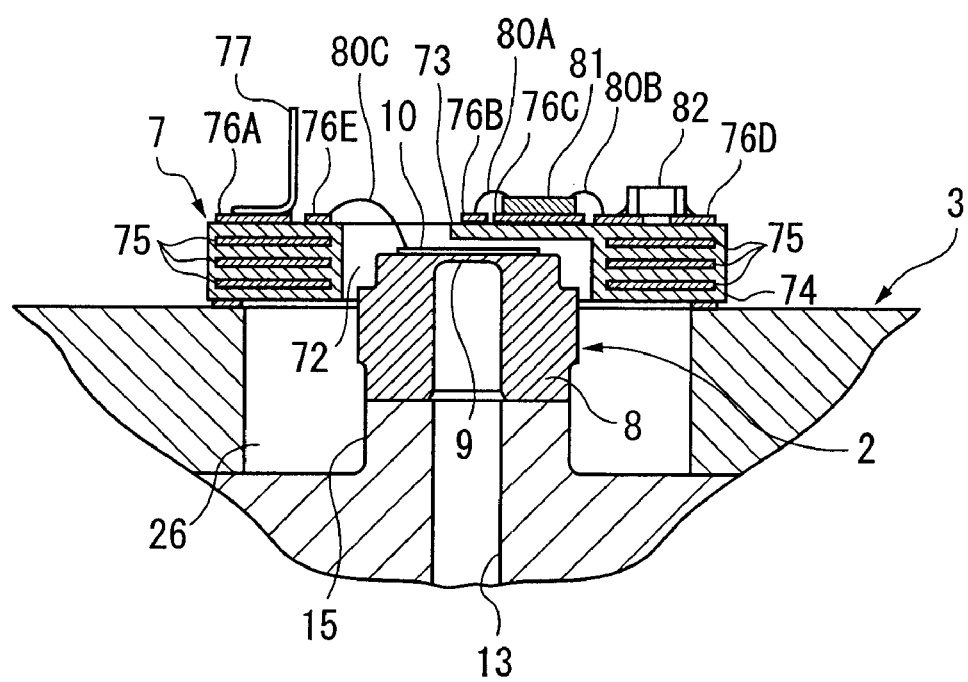
FIG. 13 is a vertical side cross section showing a circuit board of the first embodiment.

FIG. 13 shows an example of a structure of a circuit board 7.

The circuit board 7 has a multi-layered structure composed of ceramic insulation layer and a conductor layer, where an opening 72 for accommodating the pressure detecting device 2 is formed at the center thereof, and a projection 73 partially projecting into the opening 72 is formed on the uppermost layer. A plurality of conductive layers 75 are provided in insulation layers 74 of the circuit board 7 and a surface conductor layer 76 (conductor layers 76A to 76E) is formed on the upper side thereof.

An input/output terminal 77 is connected to the conductor layer 76A, an integrated circuit 81 is mounted on the conductor layer 76C and a filter circuit 82 is mounted on the conductor layer 76D. The integrated circuit 81 and the conductor layers 76B and 76D are connected by bonding wires 80A and 80B. The conductor layer 76E and the strain gauge 10 are connected by a bonding wire 80C.

Incidentally, though the circuit board 7 is held on the flange member 3 in the structure of FIG. 13, the circuit board 7 may be directly held by the pressure detecting device 2 (which is the same in the below-described embodiments).

Next, assembly process of the pressure sensor will be described below.

Initially, the lower surface of the pressure detecting device 2 is bonded to the upper surface of the butt welding portion 15 of the joint 1 by electron beam welding or laser welding etc. Next, the flange member 3 is bonded to the upper surface of the flange 14 of the joint 1 by a ring projection welding etc. Accordingly, the pressure detecting device 2 is accommodated in the through-hole 26 of the flange member 3 (see FIG. 1). Incidentally, the flange member 3 and the joint 1 may be fixed by screwing. Further, the bottom surface 6A of the connector 6 may be fitted to the recess 27 of the flange member 3 and bonded by ring-projection welding etc.

When the joint 1, the pressure detecting device 2, the flange member 3 and the connector 6 are assembled as in the above, the circuit board 7 is assembled on the flange member 3 through the adhesive 31, and the circuit board 7 and the pressure detecting device 2 are wired by the bonding wire 80C.

Subsequently, the terminal 32 and the terminal base 33 are bonded to the circuit base 7. When the terminal base 33 is attached to the connector 6, the lug 33C and the notch 22B are fitted and engaged in a correct posture. By crimping the bent end 23A of the connector 6, the terminal base 33 is fixed on the upper surface of the flange member 3. At this time, the terminal base 33 spans over the circuit board 7.

Then, after adjusting output of the circuit board 7, a gasket 35 is inserted to the outer wall of the terminal 34 on the terminal base 33 to install the housing 5. In attaching the housing 5 to the connector 6, the terminal 34 of the terminal base 33 is inserted to the through-hole 36B of the housing 5 and the lug 37B and the notch 22C are fitted and engaged in a correct posture. The attachment 37 is fitted to the annular groove 24 of the connector 6 through the O-ring 38, which is fixed by crimping the outer wall 21 of the connector 6 to the attachment 37. Incidentally, the O-ring 38 can be easily inserted using the outer tapered surface of the bent end 23B of the connector 6 as a guide.

According to the present embodiment, following advantages can be obtained.

(1) Since the joint 1 and the flange member 3 are provided as separate bodies which are bonded, the flange member 3 can be bonded to the joint 1 after welding the pressure detecting device 2 to the joint 1. Accordingly, the pressure detecting device 2 can be contacted and welded to the exposed butt welding portion 15 with no flange member 3, so that management work such as weld line alignment can be facilitated.

(2) Since the pressure detecting device 2 is accommodated in the flange member 3 without being projected from the upper surface of the flange member 3 and, accordingly, the circuit board 7 can be directly located on the flange member 3, the entire length of the pressure sensor can be shortened.

Further, since the circuit board 7 is directly located on the flange member 3, the support base for supporting the circuit board 7 directly above the pressure detecting device 2 is not required, thus reducing the number of components and production cost.

(3) Since the connector 6 is an independent body and has an outer wall 21 provided on an outside of the inner wall 20 with the annular groove 24 therebetween, the outer wall 21 being the outer wall 21 of the housing 5, the connector 6 can be easily produced by a presswork of metal material and no carving process of the joint 1 is required, thereby reducing the production cost.

(4) Since the bent ends 23A and 23B are formed by bending the upper periphery of the inner wall 20 of the connector 6, the terminal base 33 can be fixed by the bent end 23A and the O-ring 38 can be inserted and guided by the bent end 23B.

(5) Since the recess 27 is formed on the upper surface of the flange member 3 and the bottom surface 6A of the connector 6 is fitted and bonded inside the recess 27 by ring-projection welding, the welded portion can be covered by the notch 27, thereby improving appearance thereof. Incidentally, the connector 6 may be directly bonded without forming the recess 27 on the upper surface of the flange member 3.

(6) In attaching the terminal base 33 to the connector 6, the lug 37B and the notch 22C are fitted to prevent rotation, so that the position shift of the connector 6 and the terminal base 33 fixed by crimping can be avoided. Especially, by fitting two types of lugs 33C and notches 22B having different width, the terminal base 33 is engaged with the connector 6 only in a correct posture, so that reverse insertion can be avoided and correct engagement can be easily and securely obtained, thereby enhancing work efficiency.

(7) In attaching the housing 5 to the connector 6, the lug 37B and the notch 22C are fitted to prevent rotation, so that the position shift of the connector 6 and the housing 5 fixed by crimping can be avoided. Especially, by fitting two types of lugs 37B and notches 22C having different width, the housing 5 is engaged with the connector 6 only in a correct posture, so that reverse insertion can be avoided and correct engagement can be easily and securely obtained, thereby enhancing work efficiency.

(8) Since the projection 73 is formed on the circuit board 7, the components can be disposed without widening the circuit board 7 by disposing the integrated circuit and conductor layers 76B and 76C for connection. Further, since the bonding wire 80C is provided to a part of the pressure detecting device 2 in a biased manner, the projection 73 can be enlarged, thereby accommodating more circuit components.

(9) Since the circuit board 7 uses a multi-layered board using ceramics as an insulation layer, the component can be mounted with a narrow space and the size of the pressure sensor can be reduced. Further, heat resistance of the board and noise immunity on account of high permittivity can be expected.

Figure 14:
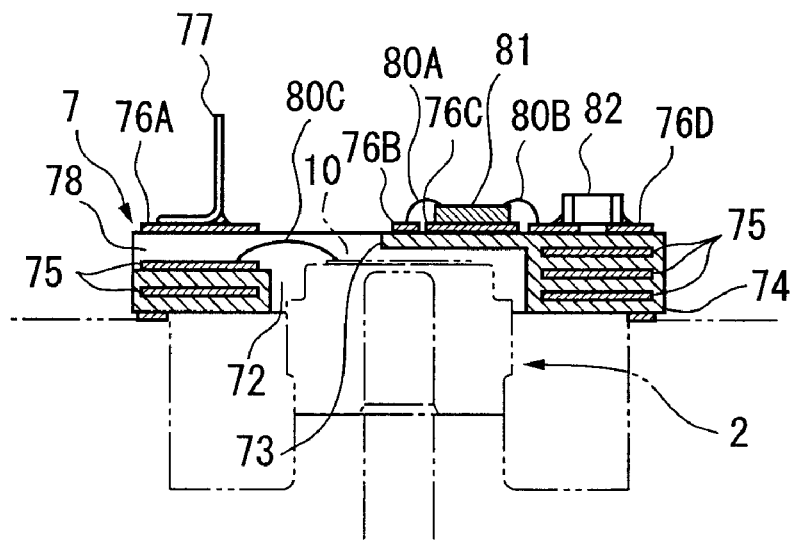
FIG. 14 is an illustration of a modification of the circuit board of the first embodiment.

Incidentally, though the bonding wire 80C is connected from the pressure detecting device 2 to the conductor layer 76E provided on the upper surface of the circuit board 7 in the first embodiment, the arrangement is not restricting but an arrangement shown in FIG. 14 may be used.

Specifically, an upper surface opposite to the projection 73 with the opening 72 of the circuit board 7 therebetween is dented to the upper surface of the pressure detecting device 2 (the surface of the strain gauge 10) and the conductor layer 75 at the bottom of the recess 78 and the pressure detecting device 2 may be connected by the bonding wire 80C. In this case, the components may be disposed on the conductor layer 75 connected by the bonding wire 80C. Accordingly, the wire bonding work can be facilitated and wiring length can be shortened.

Figure 15:
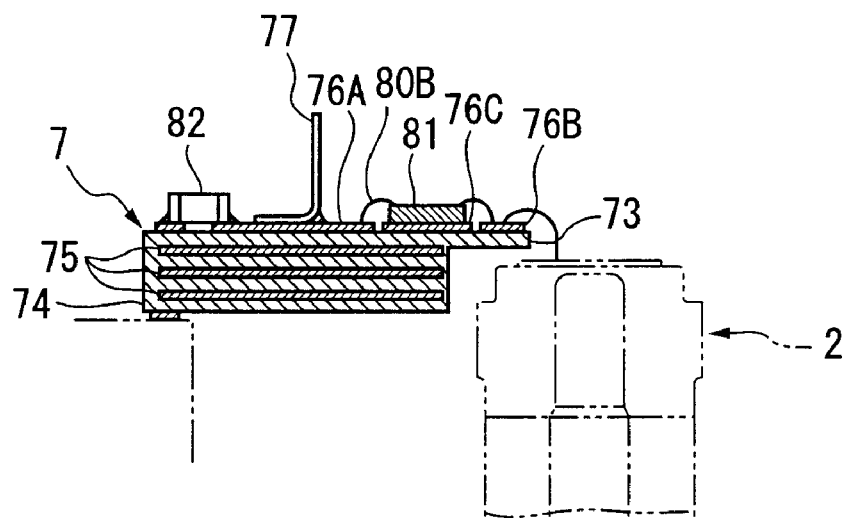
FIG. 15 is an illustration showing another modification of the circuit board of the first embodiment.

Further, though the circuit board 7 has a structure having the projection 73 formed on the hole opening 72 at the center thereof, a side thereof may be opened as shown in FIG. 15.

Specifically, the conductor layer 75 may be provided in the insulation layer 74, a projection 73 projecting to one-side (the pressure detecting device 2 side) is formed on the uppermost layer, and the conductor layers 76A, 76B and 76C, input/output terminal 77, the integrated circuit 81 and the filter circuit 82 are provided on the upper surface thereof. Such arrangement is useful in disposing the circuit board 7 on one side of the pressure detecting device 2.

In attaching the terminal base 33 to the connector 6 and the housing 5 to the connector 6, though two lug and notch fitting having different widths are used, equal width arrangement is possible if only position shift prevention is required. Further, in order to prevent the reverse insertion for enhancing workability, the fitting structure of the same width may be disposed in unequal interval. The reverse insertion can be prevented only by providing a part of the fitting structure.

[Second Embodiment]

Figure 16:
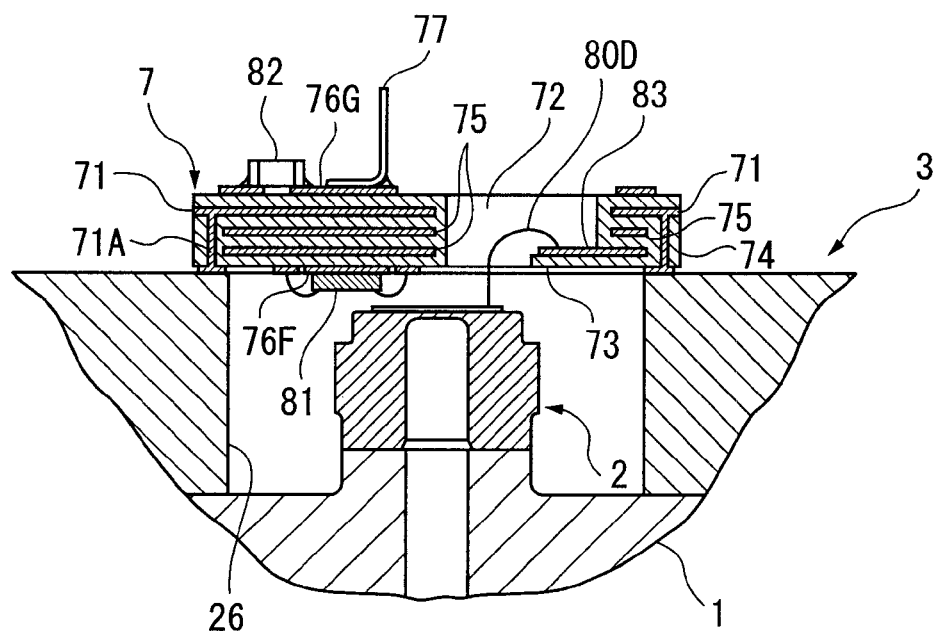
FIG. 16 is a vertical side cross section showing a primary portion of a pressure sensor according to second embodiment of the present invention.

FIG. 16 is a vertical side cross section showing a pressure sensor according to second embodiment.

Incidentally, in the present embodiment, the arrangement other than the circuit board 7 is the same as the above-described first embodiment and the description thereof will be omitted.

In the present embodiment, a multi-layered circuit board 7 having an opening 72 formed at a position shifted from the center of the circuit board 7 and a projection 73 partially projected into the opening 72 formed at the lowermost layer is used.

A plurality of conductor layers 75 and a ground-plane layer 71 are provided in an insulation layer 74 of the circuit board 7. A conductor layer 76G is provided on the upper surface of the insulation layer 74, a conductor pad 83 is provided on the projection 73 and a conductor layer 76F is provided on the lower surface of the insulation layer 74. An input/output terminal 77 and a filter circuit 82 are mounted on the conductor layer 76G on the upper surface, and an integrated circuit 81 is mounted on the lower side conductor layer 76F, respectively. The pad 83 and the pressure detecting device 2 are connected via the bonding wire 80D.

The uppermost conductor layer is the ground-plane layer 71. A conductor 71A extending in height direction is provided to the ground-plane layer 71, the conductor 71A being connected with the flange member 3 to be conducted to the joint 1. Accordingly, the ground-plane layer 71 is arranged as a ground-plane having the same electric potential as the case ground of the pressure sensor and a space shielded against foreign radiation noise is formed by the metal flange member 3 and the ground-plane layer 71, in which the integrated circuit 81 is disposed.

The ground-plane layer 71 has conductor plate structure having substantially the same area as the circuit board 7 (except for a certain width of the periphery of the circuit board 7 and the circumference of via-hole for connecting the conductor layer 75 located at upper and lower part with the conductor layer 76G), thereby forming a shielded space having practically sufficient function.

According to the present embodiment, following advantages can be obtained.

(10) Since the circuit components of the circuit board 7 are located on top and bottom surfaces, the width of the circuit board 7 can be reduced, thereby reducing the size of the pressure sensor.

(11) Since the bonding wire 80D is connected from the pad 83 on the projection at the lowermost layer to the pressure detecting device 2, the length of the wiring can be shortened.

(12) Since the opening 72 works as a dam when a silicone gel for protecting the bonding wire 80D is potted, the resin can be prevented from being flowing out and the protective material can be coated only on the neighborhood of the bonding wire 80D.

(13) Since the ground-plane layer 71 is provided to be electrically conducted to the flange member 3 or the joint 1 by the conductor 71A, the ground-plane layer 71 can be set at the same electric potential as the case ground, so that the space shielded against foreign radiation noise can be formed between the ground-plane layer 71 and the flange member 3, where the integrated circuits 81 can be disposed.

Figure 17:
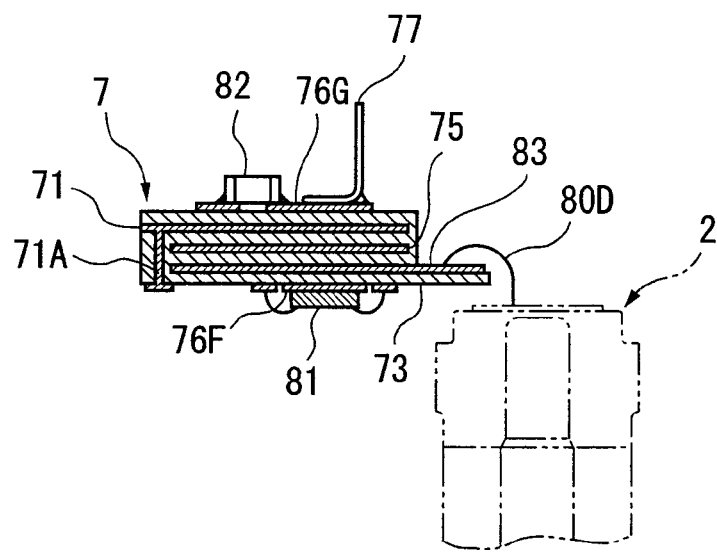
FIG. 17 is a vertical cross section showing a modification of the second embodiment.

Incidentally, in the second embodiment, one-side open arrangement as shown in FIG. 17 can be employed. Specifically, a projection 73 is formed on the lowermost layer to project to one-side (a side of the pressure detecting device 2), and a conductor layer 76G, the input/output terminal 77 and the filter circuit 82 are provided on the upper surface. Such arrangement is useful in an arrangement having the circuit board provided on one side of the pressure detecting device 2.

[Third Embodiment]

Figure 18:
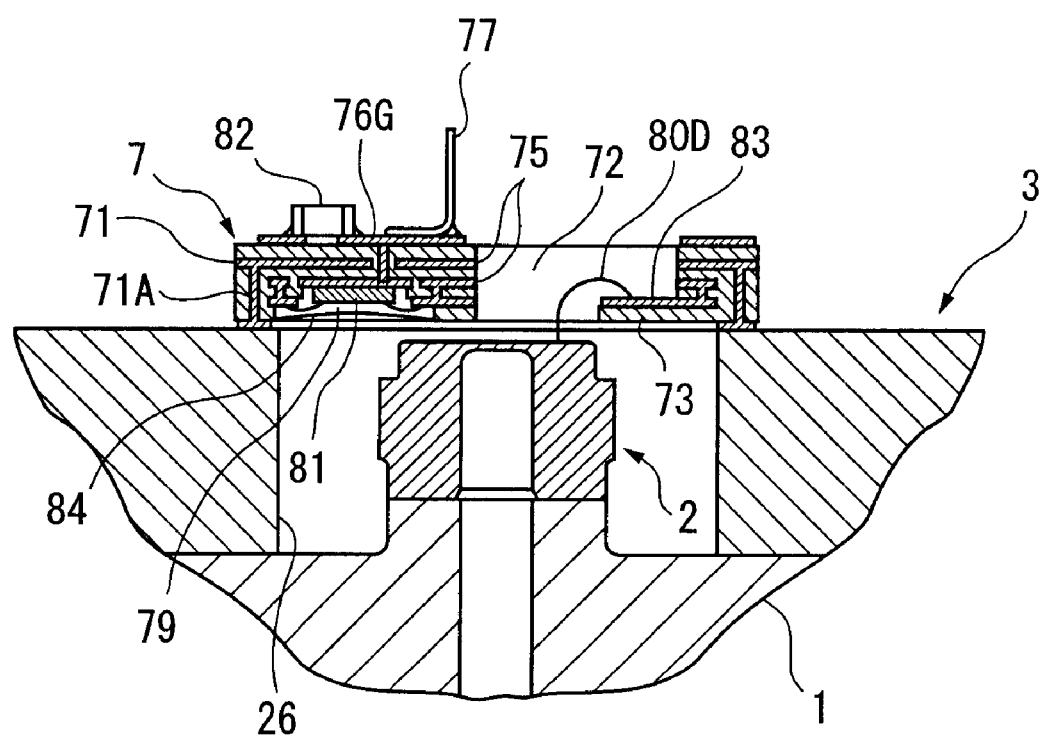
FIG. 18 is a vertical side cross section showing a primary portion of a pressure sensor according to third embodiment of the present invention.

FIG. 18 is a vertical side cross section showing a pressure sensor according to third embodiment.

Incidentally, the arrangement other than the circuit board 7 is the same as the above-descried first embodiment and description thereof is omitted.

In the present embodiment, a recess 79 is formed on the lower side of the circuit board 7 of the second embodiment and the integrated circuit 81 is accommodated in the recess 79, which are sealed with a molding compound 84.

Incidentally, in the third embodiment (also in the second embodiment), when the pressure detecting device 2, the pad 83 and the bonding wire 80D are influenced by being exposed to noise on account of the opening 72, a lid (not shown) may be provided from above the opening 72 to connect to the case ground, thereby forming a shielded space to prevent the influence of noise.

According to the present embodiment, in addition to the respective advantages of the second embodiment, following advantages can be obtained.

(14) Since the integrated circuit 81 is accommodated in the recess 79 at the back of the circuit board 7, the distance between the circuit board 7 and the pressure detecting device 2 can be further reduced, so that the length of the bonding wire 80D can be arranged shorter than the second embodiment. Further, since the integrated circuit 81 can be located just above the pressure detecting device 2 by burying the integrated circuit 81 in the recess 79, the dimension of the outer configuration of the circuit board 7 can be further reduced. Accordingly, the size reduction (reduction in height and diameter), improvement in vibration strength and in assembly workability can be obtained.

Incidentally, in the above-described first to third embodiments, in order to produce the circuit board 7, so-called laminated ceramic technique where a thin (e.g. approximately 250 μm) ceramic green sheet is punched, pattern-printed, laminated and fired may be used for easily producing the circuit board 7 without complicated processing such as machining. Incidentally, the laminated ceramic technique is used in ceramic package of integrated circuit etc.

[Fourth Embodiment]

Figure 19:
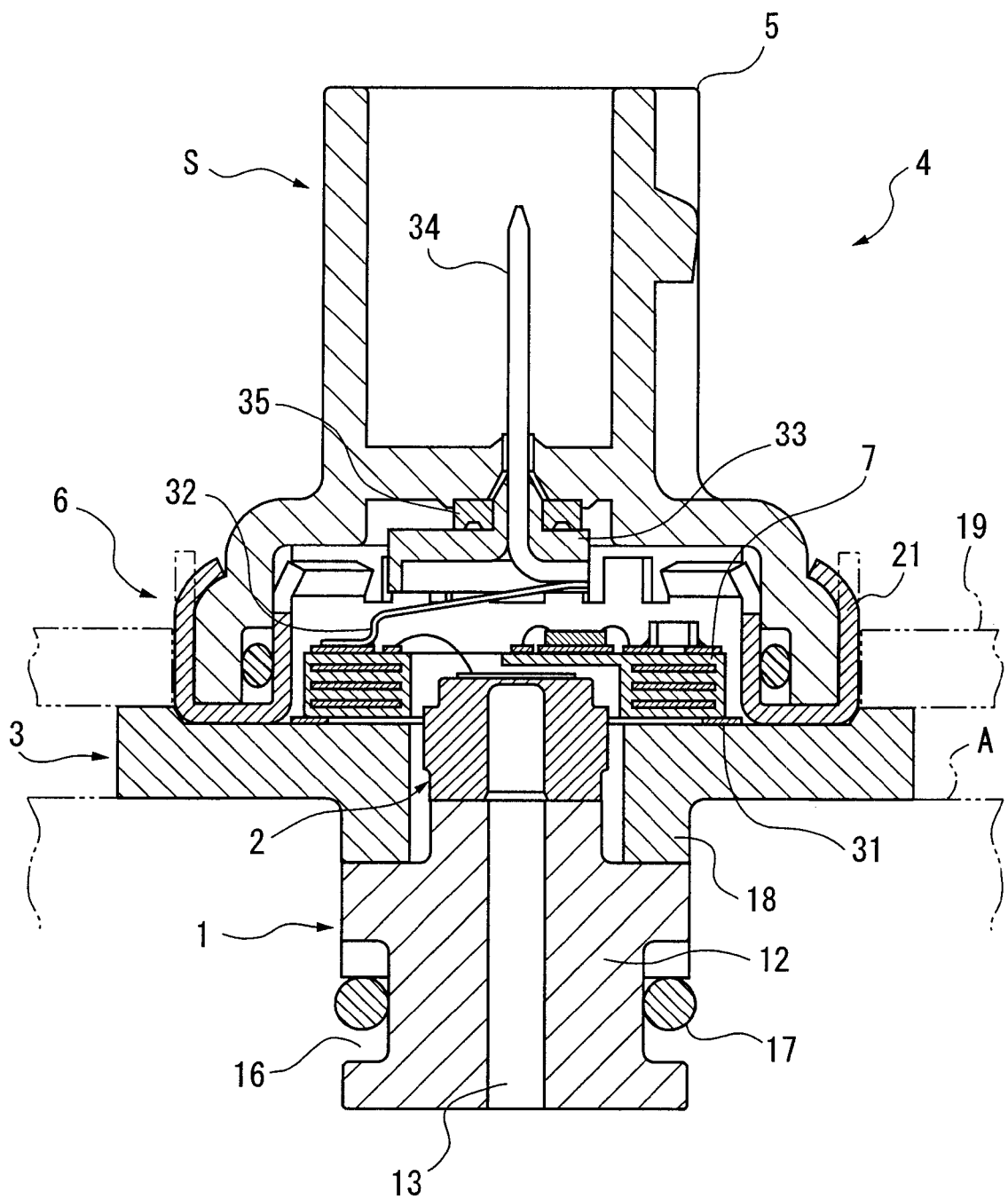
FIG. 19 is a vertical side cross section showing a pressure sensor according to fourth embodiment of the present invention.

FIG. 19 shows fourth embodiment of a pressure sensor S according to the present invention.

Incidentally, in order to describe the present embodiment, the same components as in the first embodiment are attached with the same reference numeral to omit or simplify the description thereof.

In the present embodiment, a groove 16 is formed on the outer wall of the body 12 of the joint 1, and an O-ring 17 as a sealing member is attached to the groove 16.

After inserting the pressure sensor S to the mount A, the flange member 3 is held by a hold plate 19 to fix the pressure sensor S to the mount A.

The flange member 3 of the present fourth embodiment has a projection 18 on a lower side thereof. Accordingly, the height of the flange member 3 is adjusted to the height of the upper surface of the pressure detecting device 2.

According to the present embodiment, in addition to the above-described respective advantages, the following advantages can be obtained.

(15) Since the joint 1 has a sealing means by the O-ring 17 instead of a screw, the joint 1 can be attached even when the mount A has no internal thread.

(16) The thickness of the flange member 3 can be reduced by forming the projection 18 on the lower side thereof.

[Fifth Embodiment]

Figure 20:
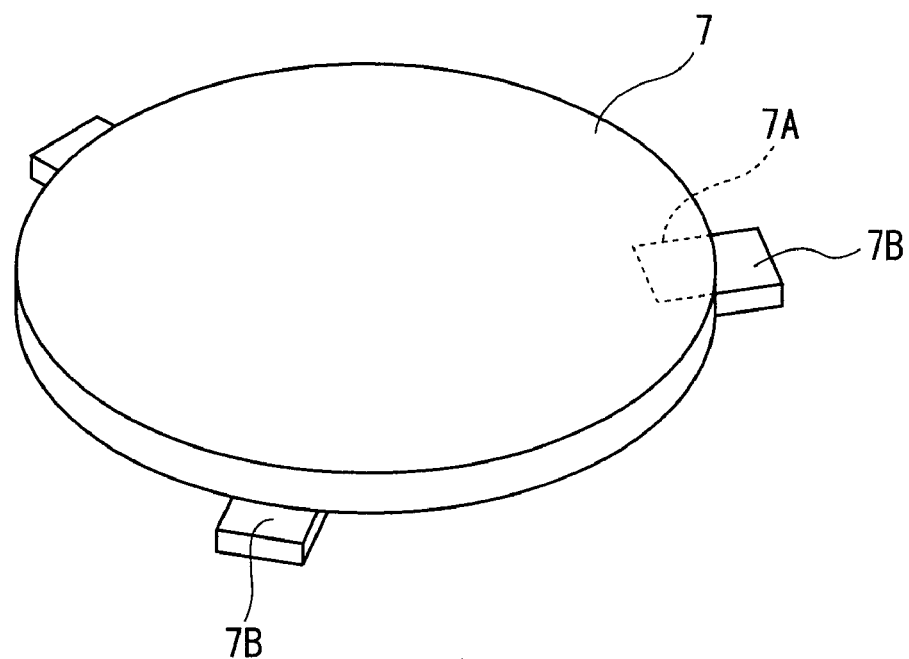
FIG. 20 is a vertical side cross section showing a circuit board according to fifth embodiment of the present invention.
Figure 21:
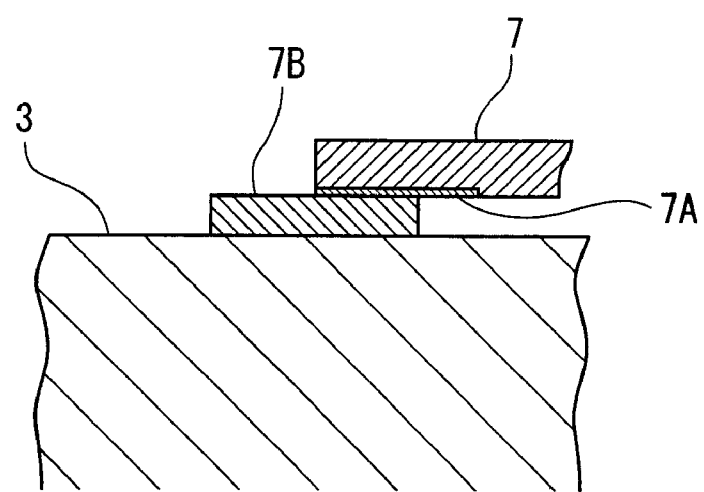
FIG. 21 is an enlarged cross section showing a primary portion of a circuit board according to the fifth embodiment.

FIGS. 20 and 21 show fifth embodiment of pressure sensor S according to the present invention.

The present embodiment relates to an improvement in a structure when a shielding effect is obtained by electrical continuity from the ground-plane layer 71, the conductor 71A etc. to the flange member 3 as in the above-described second and third embodiments.

In the above-described second and third embodiments, the ground-plane layer 71 is exposed on the lower side of the circuit board 7 via the conductor 71A and is adhered to the flange member 3 by a conductive adhesive. For use under strong vibration, more rigid bonding such as soldering is desired. However, when the circuit board 7 is installed in the pressure sensor by soldering, considering process for mounting the components on the circuit board 7, two soldering and flux removal processes are necessary, thereby deteriorating productivity.

In the present embodiment, a ground land 7A is formed on the periphery of the lower side of the circuit board 7 and the conductor 71A etc. is connected to the ground land 7A. In mounting the components, the ground terminal 7B is simultaneously soldered to the ground land 7A. Incidentally, other ground terminals 7B are soldered to the circuit board 7 at two positions around the ground terminal 7B, thereby supporting the circuit board 7 at three positions. Incidentally, the two locations may be a dummy, i.e. may not be connected to the conductor 71A etc.

In order to mount the circuit board 7 to the flange member 3, one or more ground terminal 7B is welded to the flange member 3 to fix the circuit board 7 and secure continuity.

The material of the ground terminal 7B is preferably be capable of being soldered to the circuit board 7 and being welded to the flange member 3. Specifically, since ferrous material such as steel and stainless steel is used for the flange member 3, tinning steel plate may preferably be used.

According to the present embodiment, in addition to the respective advantages of the second and the third embodiments, following advantages can be obtained.

(17) Since the circuit board 7 can be mounted to the pressure sensor by welding, repeated soldering and flux removal process subsequent to mounting the components can be omitted, thereby simplifying the work process.

(18) Since the ground terminal 7B is electrically conducted to the conductor 71A through the soldered ground land 7A and is electrically conducted to the welded flange member 3, secure electric continuity can be maintained.

Figure 22:
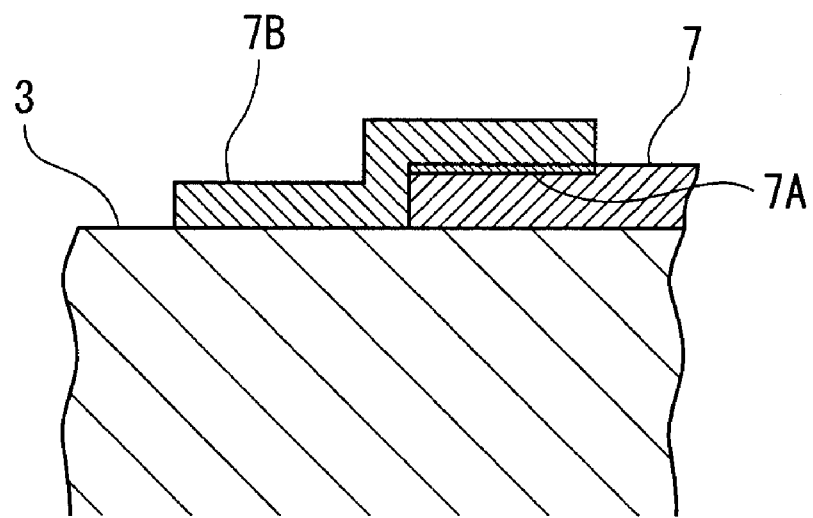
FIG. 22 is an enlarged cross section showing a modification of the fifth embodiment.

Incidentally, the ground land 7A for the ground terminal 7B to be soldered may not be provided on the lower side of the circuit board 7 but may be provided on the upper side of the circuit board 7 as shown in FIG. 22. In this case, a component of substantially Z-shape cross section can be used as the ground terminal 7B, which goes down the depth of the circuit board 7 to reach the surface of the flange member 3.

[Sixth Embodiment]

Figure 23:
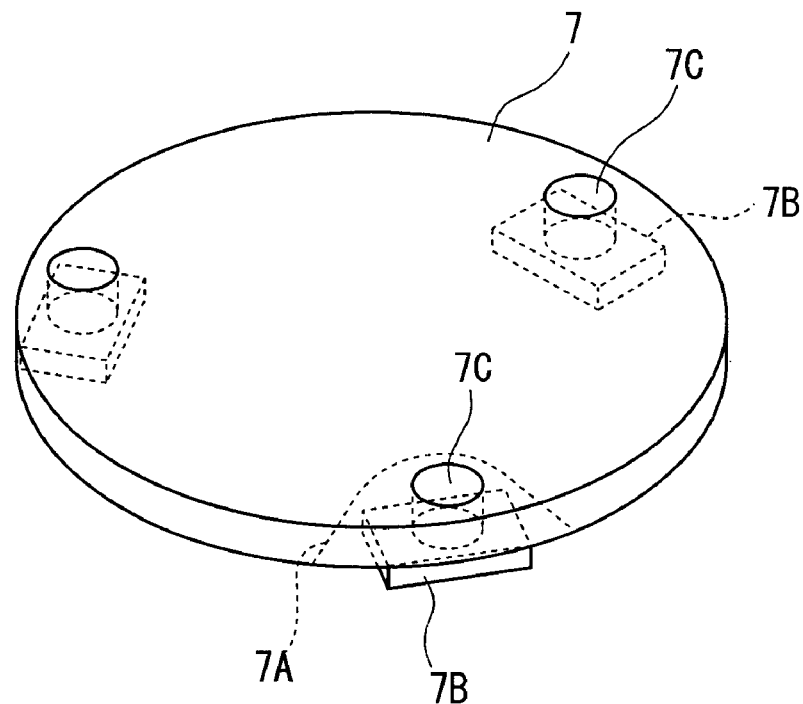
FIG. 23 is a perspective view showing a circuit board according to sixth embodiment of the present invention.
Figure 24:
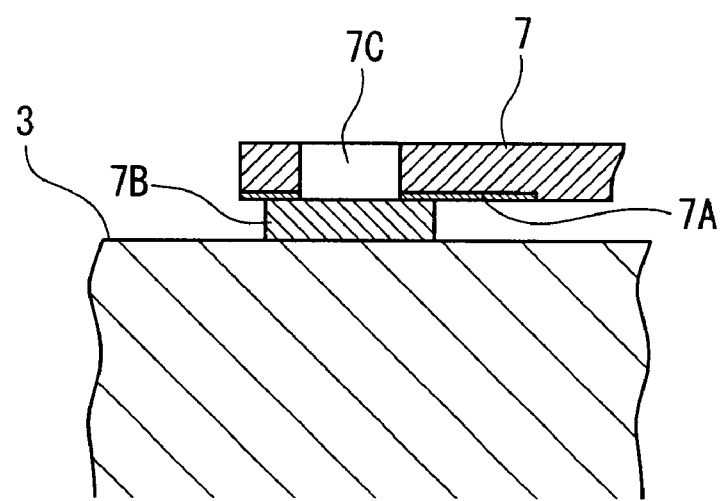
FIG. 24 is an enlarged cross section showing a primary portion of a circuit board according to the sixth embodiment.
Figure 25:
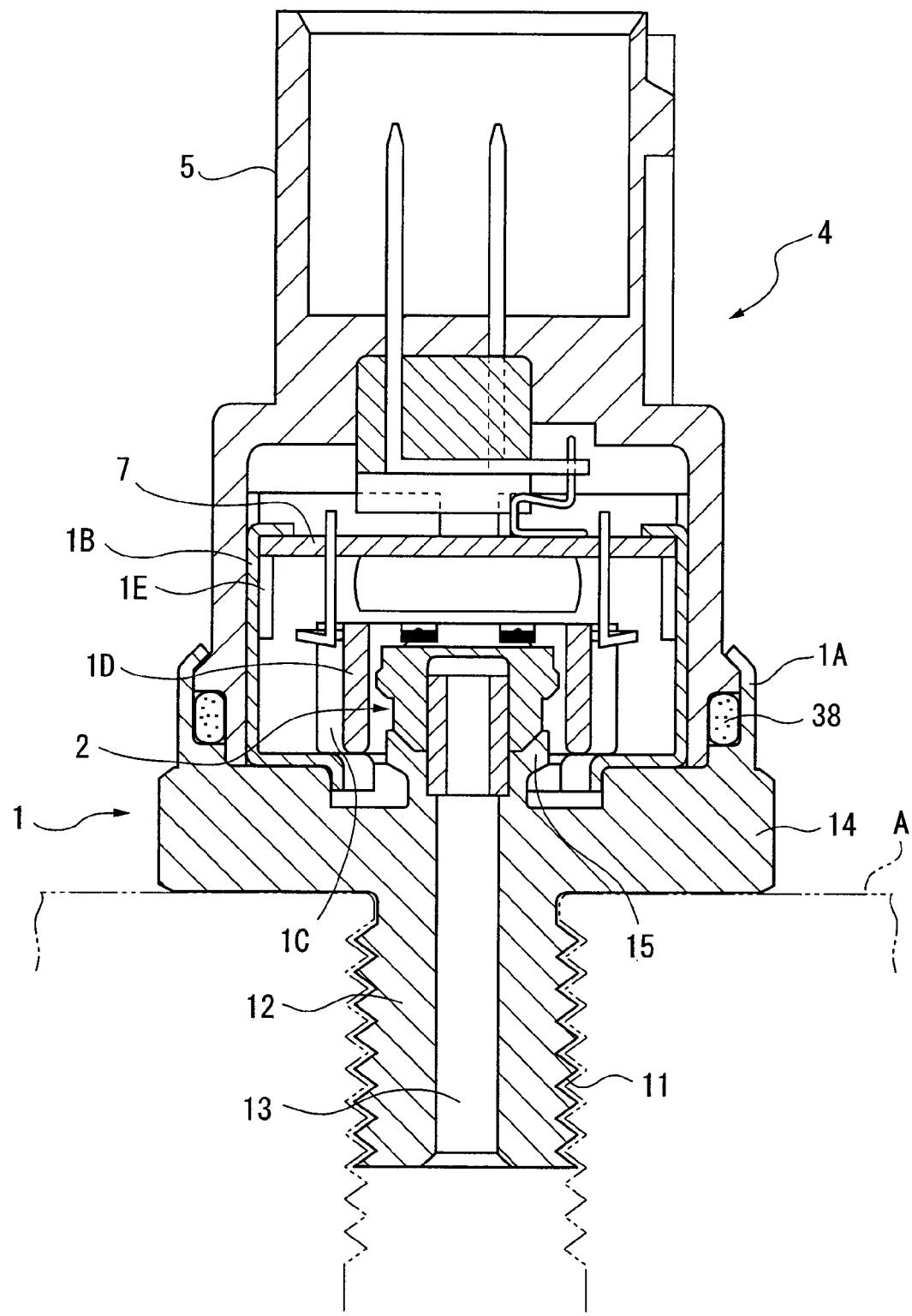
FIG. 25 is a vertical side cross section showing a conventional pressure sensor.
Figure 26:
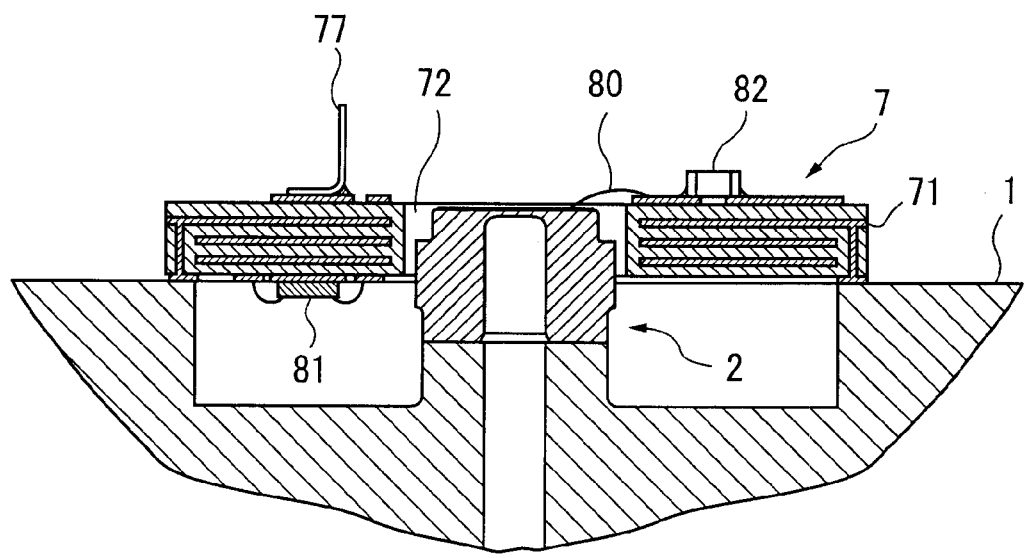
FIG. 26 is a vertical side cross section showing a primary portion of another conventional pressure sensor.
Figure 27:
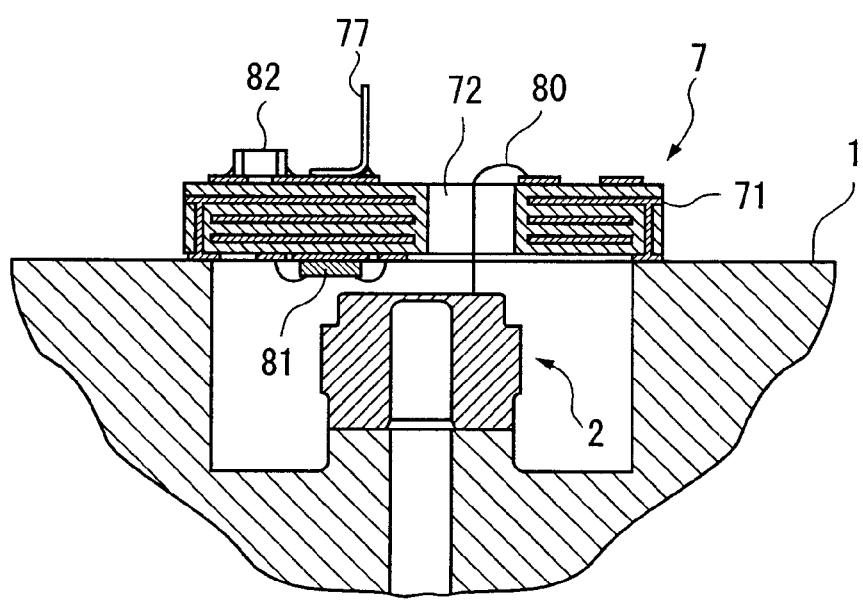
FIG. 27 is a vertical side cross section showing a primary portion of still another conventional pressure sensor.

FIGS. 23 and 24 show sixth embodiment of pressure sensor S according to the present invention.

In the embodiment, a disposition of the ground terminal 7B of the above-described fifth embodiment is changed. A through hole 7C is formed facing the ground land 7A. The ground terminal 7B is in close contact with the ground land 7A and is soldered to the ground land 7A through the through hole 7C. The ground terminals 7B are provided in the same manner on the other two locations of the circuit board 7.

According to the present embodiment, in addition to the respective advantages of the fifth embodiment, following advantages can be obtained.

(19) Since the ground terminal 7B does not project to the outside of the circuit board 7, mechanical interference against the surroundings can be avoided, thereby further reducing mount space.

What is claimed is:

1. A pressure sensor, comprising:

a joint having a pressure port;

a pressure detecting device attached to the joint for converting a fluid pressure introduced to the pressure port into an electric signal;

a housing provided to an output side of the pressure detecting device;

a flange member having a first side bonded to the joint and having a through-hole for accommodating the pressure detecting device at a center thereof; and a connector bonded to a second opposing side of the flange member to fix the housing.

2. The pressure sensor according to claim 1, wherein the connector includes a substantially cylindrical inner wall, a substantially cylindrical outer wall coaxially disposed outwardly of the inner wall and an annular groove formed between the inner wall and the outer wall.

3. The pressure sensor according to claim 2, further comprising a crimping part formed at a peripheral end of the outer wall of the connector opposite to the flange member, wherein the housing has a lower end fitted into the annular groove and caulked by the crimping part.

4. The pressure sensor according to claim 2, wherein either one of a lug and a notch being mutually fitted is formed on one of the inner wall of the connector and the housing.

5. The pressure sensor according to claim 4, wherein a plurality of pairs of the lug and the notch are formed, one of the pairs having dimension or configuration different from the other pair.

6. The pressure sensor according to claim 4, wherein a plurality of pairs of the lug and the notch are formed, the pairs being arranged along a circumference of the inner wall at unequal intervals.

7. The pressure sensor according to claim 2, including a terminal base located inside the housing, and wherein a bent end capable of being bent inwardly is formed at a peripheral end of the inner wall of the connector opposite to the flange member, the bent end crimping and fixing the terminal base to the flange member.

8. The pressure sensor according to claim 7, wherein the peripheral end of the inner wall opposite to the flange member is divided by a plurality of notches.

9. The pressure sensor according to claim 7, wherein either one of a lug and a notch being mutually fitted is formed on one of the inner wall of the connector and the terminal base respectively.

10. The pressure sensor according to claim 9, wherein a plurality of pairs of the lug and the notch are formed, one of the pairs having dimension or configuration different from the other pair.

11. The pressure sensor according to claim 9, wherein a plurality of pairs of the lug and the notch are formed, the pairs being arranged along a circumference of the inner wall at unequal intervals.

12. The pressure sensor according to claim 7, wherein a circuit board connected to the pressure detecting device is located on the second side of the flange member opposite to the joint, the circuit board being surrounded by the terminal base.

13. The pressure sensor according to claim 12, the circuit board comprising: a ground land capable of being formed on a surface of the circuit board; and a ground terminal soldered to the ground land and welded to the flange member.

14. The pressure sensor according to claim 12, wherein the circuit board comprises a multi-layered structure having a plurality of conductor layers, and wherein at least one of the conductor layers includes a projection projecting relative to the other conductor layer, the projection being located around and immediately above the pressure detecting device.

15. The pressure sensor according to claim 14, wherein the circuit board includes an opening for accommodating the pressure detecting device, and wherein an uppermost layer of the conductor layers comprises the layer projecting into the opening to form the projection.

16. The pressure sensor according to claim 14, wherein the conductor layer having the projection and the pressure detecting device are connected and the conductor layer other than the conductor layer having the projection comprises a ground-plane layer, and wherein a circuit component for forming a circuit on the circuit board is provided on a surface of the circuit board facing the pressure detecting device.

17. The pressure sensor according to claim 16, wherein a recess is formed on a pressure detecting device side of the circuit board, a circuit component forming a circuit being attached to the circuit board in the recess.

18. The pressure sensor according to claim 14, wherein the circuit board comprises a multi-layered substrate using ceramics as an insulation layer.

19. The pressure sensor according to claim 1, wherein a circuit board connected to the pressure detecting device is located on the second side of the flange member.

20. The pressure sensor according to claim 19, the circuit board comprising: a ground land capable of being formed on a surface of the circuit board; and a ground terminal soldered to the ground land and welded to the flange member.

21. The pressure sensor according to claim 19,
wherein the circuit board comprises a multi-layered structure having a plurality of conductor layers, and
wherein at least one of the conductor layers includes a projection projecting relative to the other conductor layer, the projection being located around and above the pressure detecting device.

22. The pressure sensor according to claim 21,
wherein the circuit board includes an opening for accommodating the pressure detecting device, and
wherein an uppermost layer of the conductor layers comprises the layer that forms the projection.

23. The pressure sensor according to claim 21,
wherein the conductor layer having the projection and the pressure detecting device are connected and the conductor layer other than the conductor layer having the projection comprises a ground-plane layer, and
wherein a circuit component for forming a circuit on the circuit board is provided on a surface of the circuit board facing the pressure detecting device.

24. The pressure sensor according to claim 21,
wherein a recess is formed on a pressure detecting device side of the circuit board, a circuit component forming a circuit being attached to the circuit board in the recess.

25. The pressure sensor according to claim 1, including a circuit board comprising a multi-layered substrate using ceramics as an insulation layer.

26. A pressure sensor, comprising:
a joint having a pressure port, the pressure port defining an axial direction for the pressure sensor;
a pressure-detecting device including a strain gauge secured to a side of the joint about the pressure port for converting fluid pressure introduced into the pressure port into an electric signal;
a flange member having a first side thereof bonded to the side of the joint and having a through-hole for accommodating the pressure-detecting device;
a circuit board secured to a second opposing side of the flange member;
a housing provided at an output side of the pressure detecting device; and
a connector having a first side for receiving and supporting the housing projecting outwardly therefrom in the axial direction, a second side of the connector being bonded to the second opposing side of the flange member outwardly of the circuit board.

27. The pressure sensor according to claim 26, including a terminal base secured to said housing and a terminal projecting axially therefrom.

* * * * *